(12) United States Patent
Beaudoin et al.

(10) Patent No.: US 10,826,698 B1
(45) Date of Patent: Nov. 3, 2020

(54) DATA STRUCTURE HAVING INTERNAL SELF-REFERENCES SUITABLE FOR IMMUTABLY REPRESENTING AND VERIFYING DATA GENERATED OVER TIME

(71) Applicant: Inveniam.io, LLC, New York, NY (US)

(72) Inventors: Valérie Beaudoin, Leesburg, VA (US); Evin T. Grano, Mitchells, VA (US); Patrick D. O'Meara, Northville, MI (US); Charles T. Shotton, Leesburg, VA (US)

(73) Assignee: Inveniam.io, LLC, New York, NY (US)

( * ) Notice: Subject to any disclaimer, the term of this patent is extended or adjusted under 35 U.S.C. 154(b) by 188 days.

(21) Appl. No.: 16/130,619

(22) Filed: Sep. 13, 2018

Related U.S. Application Data

(60) Provisional application No. 62/558,140, filed on Sep. 13, 2017, provisional application No. 62/558,142, filed on Sep. 13, 2017.

(51) Int. Cl.
| | |
|---|---|
| *H04L 9/32* | (2006.01) |
| *G06Q 40/06* | (2012.01) |
| *H04L 9/06* | (2006.01) |
| *G06F 16/93* | (2019.01) |
| *G06F 16/182* | (2019.01) |

(52) U.S. Cl.
CPC .......... *H04L 9/3213* (2013.01); *G06F 16/182* (2019.01); *G06F 16/93* (2019.01); *G06Q 40/06* (2013.01); *H04L 9/0637* (2013.01); *H04L 9/0643* (2013.01); *H04L 2209/38* (2013.01)

(58) Field of Classification Search
CPC ... H04L 9/3213; H04L 9/0637; H04L 9/0643; H04L 2209/38; G06F 16/182; G06F 16/93; G06Q 40/06
See application file for complete search history.

(56) References Cited

U.S. PATENT DOCUMENTS

| | | | | |
|---|---|---|---|---|
| 10,025,941 | B1* | 7/2018 | Griffin | G06F 21/6209 |
| 2017/0346693 | A1* | 11/2017 | Dix | H04L 9/3265 |
| 2018/0088928 | A1* | 3/2018 | Smith | H04L 67/34 |
| 2018/0158034 | A1* | 6/2018 | Hunt | G06Q 20/027 |
| 2018/0285971 | A1* | 10/2018 | Rosenoer | G06Q 40/025 |
| 2018/0365686 | A1* | 12/2018 | Kondo | H04L 63/123 |

* cited by examiner

*Primary Examiner* — Techane Gergiso
(74) *Attorney, Agent, or Firm* — Cooley LLP

(57) ABSTRACT

Some embodiments described herein relate to a computer implemented method that includes receiving a token that includes a reference to a first encrypted archive recorded in a distributed ledger. The first encrypted archive can be decrypted using the token to retrieve a first manifest document, which can be associated with a first activity of the complex transaction. The first manifest document can identify a second encrypted archive. The second encrypted archive can be decrypted using the token to retrieve a second manifest document, which can be associated with a second activity of the complex transaction. The second manifest document can include a reference to a data product, which can be retrieved. A continuity of the complex transaction between the second activity and the first activity can be verified based on the data product.

20 Claims, 8 Drawing Sheets

DATA STRUCTURE HAVING INTERNAL SELF-REFERENCES SUITABLE FOR IMMUTABLY REPRESENTING AND VERIFYING DATA GENERATED OVER TIME

CROSS REFERENCE TO RELATED APPLICATIONS

This application is a non-provisional of and claims the benefit of priority of U.S. Provisional Patent Application Nos. 62/558,140 and 62/558,142, each filed Sep. 13, 2017, the disclosure of each of which is hereby incorporated by reference in its entirety. This application is related to a U.S. Non-Provisional Patent Application No. 16/130,628, filed Sep. 13, 2018, entitled "Apparatus and Methods for Producing Data Structures Having Internal Self-References Suitable for Immutably Representing and Verifying Data," the disclosure of which is hereby incorporated by reference in its entirety.

FIELD

The present application generally relates to a chain of data structures each having an internal reference to other data structures in the chain and methods and apparatus for creating and interacting with such data structures. The data structures can be committed to a distributed ledger.

BACKGROUND

As opposed to a simple or bilateral transaction a complex transaction involves multiple participants and may include non-principal third parties such as regulators, auditors, financial modelers, legal advisors, and so forth. A complex transaction may involve long periods of time (months to years) to complete and may involve voluminous transaction data, including transfer of assets, satisfaction of assets, as well as data products generated by non-principal third parties such as regulatory approval, audit reports, financial models, legal opinions, and so forth that the complex transaction incorporates or relies upon. Example complex transactions are private equity transactions, securities trading, commercial banking, energy trading, municipal bonds, and so forth. Generally speaking, a complex transaction is a transaction involving three or more participants that cannot be reduced to a set of computer executable instructions that completely describes the transaction.

Some known distributed ledger systems may be suitable to carry out relatively simple (e.g., bilateral) transactions using "smart contracts," or the like. Such known distributed ledger systems, however, typically assume that an entire transaction can be reduced to computer-executable code that can be automatically triggered when certain conditions are met. This assumption does not hold for many complex transactions. Often events and data products associated with complex transactions cannot be reduced to computer-executable code, and may depend upon underlying legal instruments that cannot be stored on a distributed ledger system, such as original deeds and notes. Embodiments described herein generally relate to systems and methods that include both an on-ledger trust system (e.g., using known distributed ledger or blockchain) transaction verification systems and an off-ledger trust system which is described in further detail herein.

DETAILED DESCRIPTION

Figure 1A:
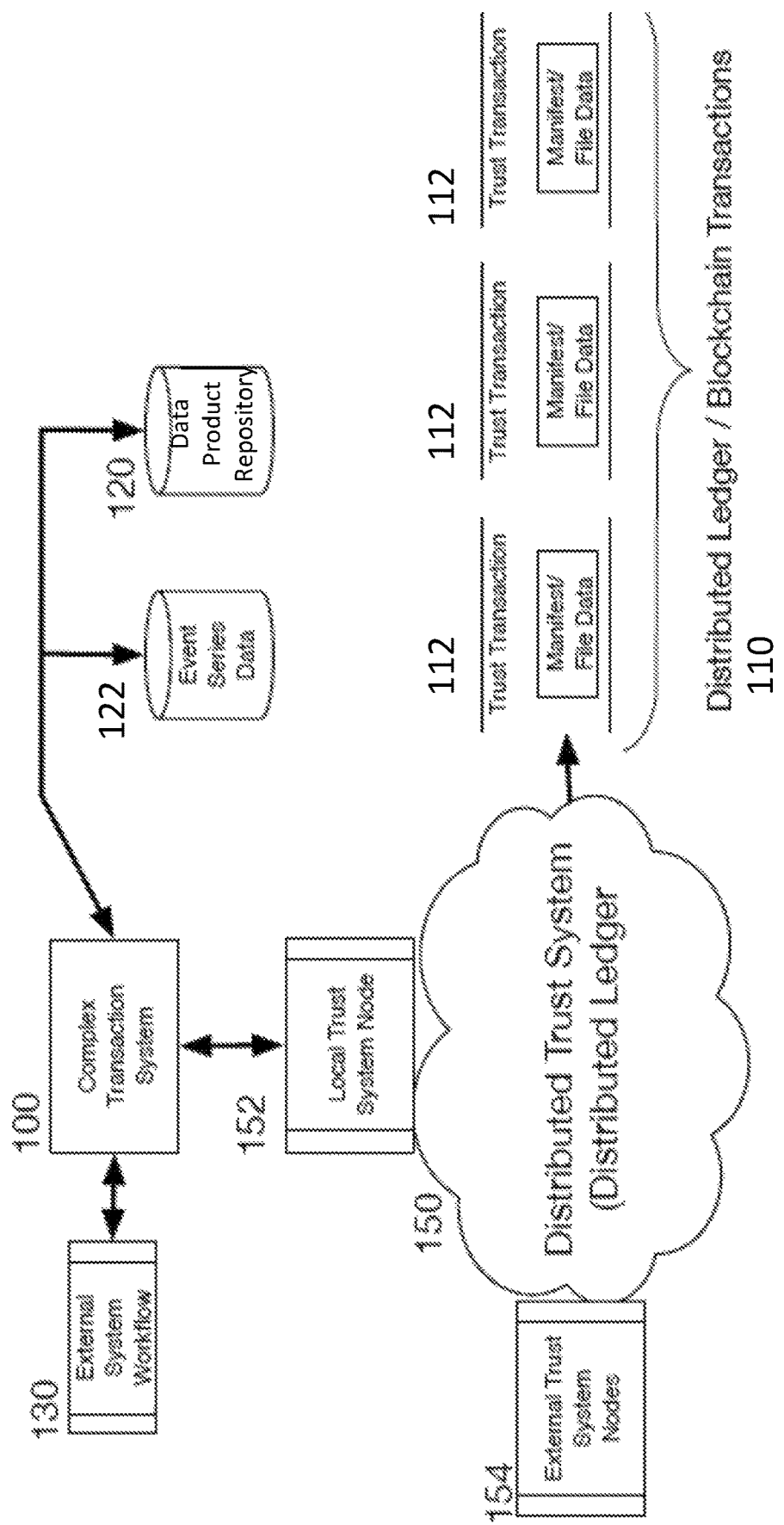
FIG. 1A is a schematic representation of a system operable to process, store, and/or reference events associated with a complex transaction, according to an embodiment.

Some embodiments described herein relate to a first compute device having a non-transitory processor readable memory and a processor that is a node of a distributed database. Similarly stated the first compute device along with other nodes (other compute devices) can collectively implement a distributed database, such as a blockchain ledger. The first compute device can therefore store a first instance of the distributed database. The first instance of the distributed database (and typically all instances of the distributed database) can include a first manifest document. The first manifest document can be associated with a first activity and/or work step of a complex transaction. The first manifest document can further include or reference one or more data products associated with the first activity and/or work step of the complex transaction. The first compute device can receive an indication of a second manifest document from a second compute device that is also a node of the distributed database, and therefore stores a second instance of the distributed database. The second manifest document can contain a reference to the first manifest document and a unique signature of the first manifest document. The first compute device can commit the second manifest document to the first instance of the distributed ledger based on receiving the indication of the second manifest document from the second compute device. The first compute device can validate a continuity between the first manifest document and the second manifest document based on the second manifest document containing the reference to the first manifest document and the first manifest document matching the unique signature of the first manifest document contained within the second manifest document such that the unique signature of the first manifest document ensures that the first manifest document and the second manifest document are unchanged since the second manifest document was defined. The first compute device can retrieve the first manifest document from the first instance of the distributed database based on the reference to the first manifest document in the second manifest document. The first compute device can further retrieve data products referenced in the first manifest document and/or the second manifest document and reconstruct the complex transaction based on the first manifest document and the second manifest document and references to data products within the first manifest document and the second manifest document.

Some embodiments described herein relate to a computer implemented method that includes receiving a token associated with a complex transaction, the token including a reference to a first encrypted archive recorded in a distributed ledger. The first encrypted archive can be decrypted using the token to retrieve a first manifest document, which can be associated with a first activity of the complex transaction. For example, the first manifest document can have been generated in response to the occurrence of the first activity. The first manifest document can identify a second encrypted archive (e.g., by identifying a location on the distributed ledger from which the second encrypted archive can be retrieved.) The second encrypted archive can be decrypted using the token to retrieve a second manifest document, which can be associated with a second activity of the complex transaction. For example, the second manifest document can have been generated in response to the occurrence of the second activity. The second manifest document can include a reference to a data product. The data product can be retrieved based on the reference to the data product in the second manifest document. A continuity of the complex transaction between the second activity and the first activity can be verified based on the data product.

Some embodiments described herein relate to a computer implemented method that includes retrieving multiple manifest documents from a distributed ledger, each manifest document can have been generated in response to an activity in a complex transaction. Each manifest document can be uniquely associated with a block of the distributed ledger. Each manifest document, other than a first manifest document, can identify at least one other manifest document. And, at least a subset of the manifest documents can identify at least one data product. Data products identified by manifest documents can be retrieved from a data repository, which can be the distributed ledger or any other suitable data repository. At least one data product can include a public encryption key that identifies an authorized party associated with the complex transaction. The identity of the authorized party can be verified using the public encryption key, which can, in part, validate the complex transaction. A representation of the complex transaction can be defined based on the plurality of manifest documents and the plurality of data products, and a simulation of the complex transaction can be initialized based on the representation of the complex transaction.

Figure 1B:
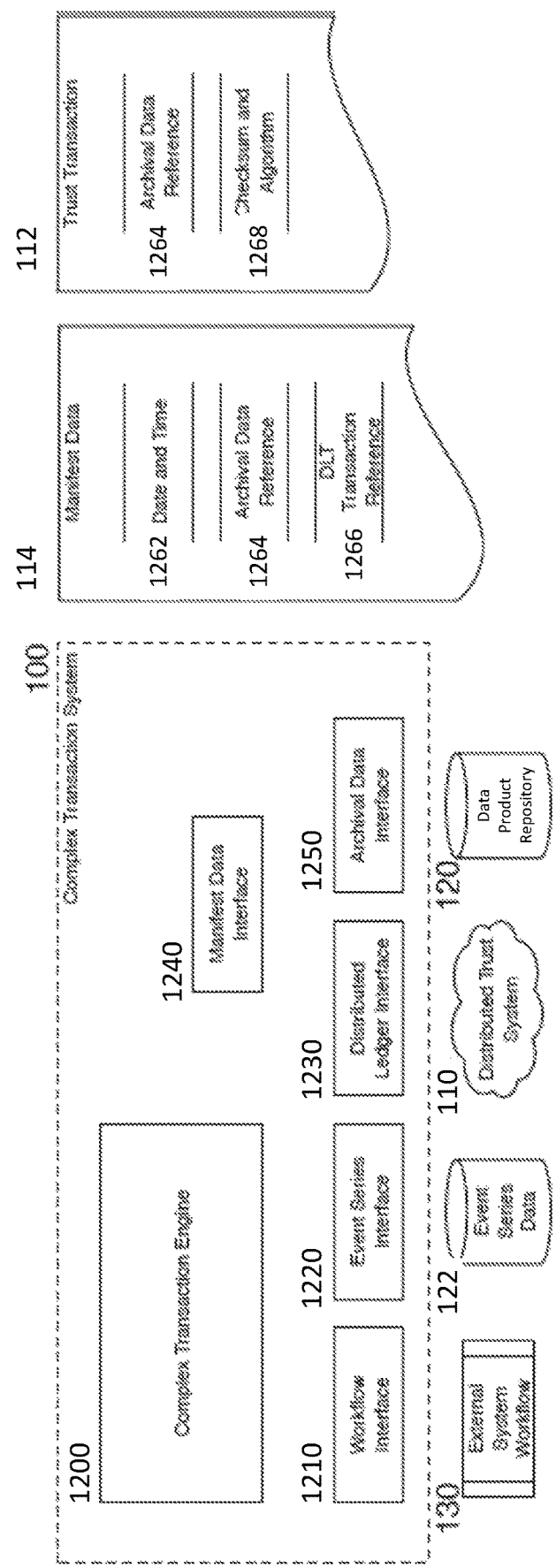
FIG. 1B is a logical schematic representation of the system of FIG. 1A, according to an embodiment.
Figure 2:
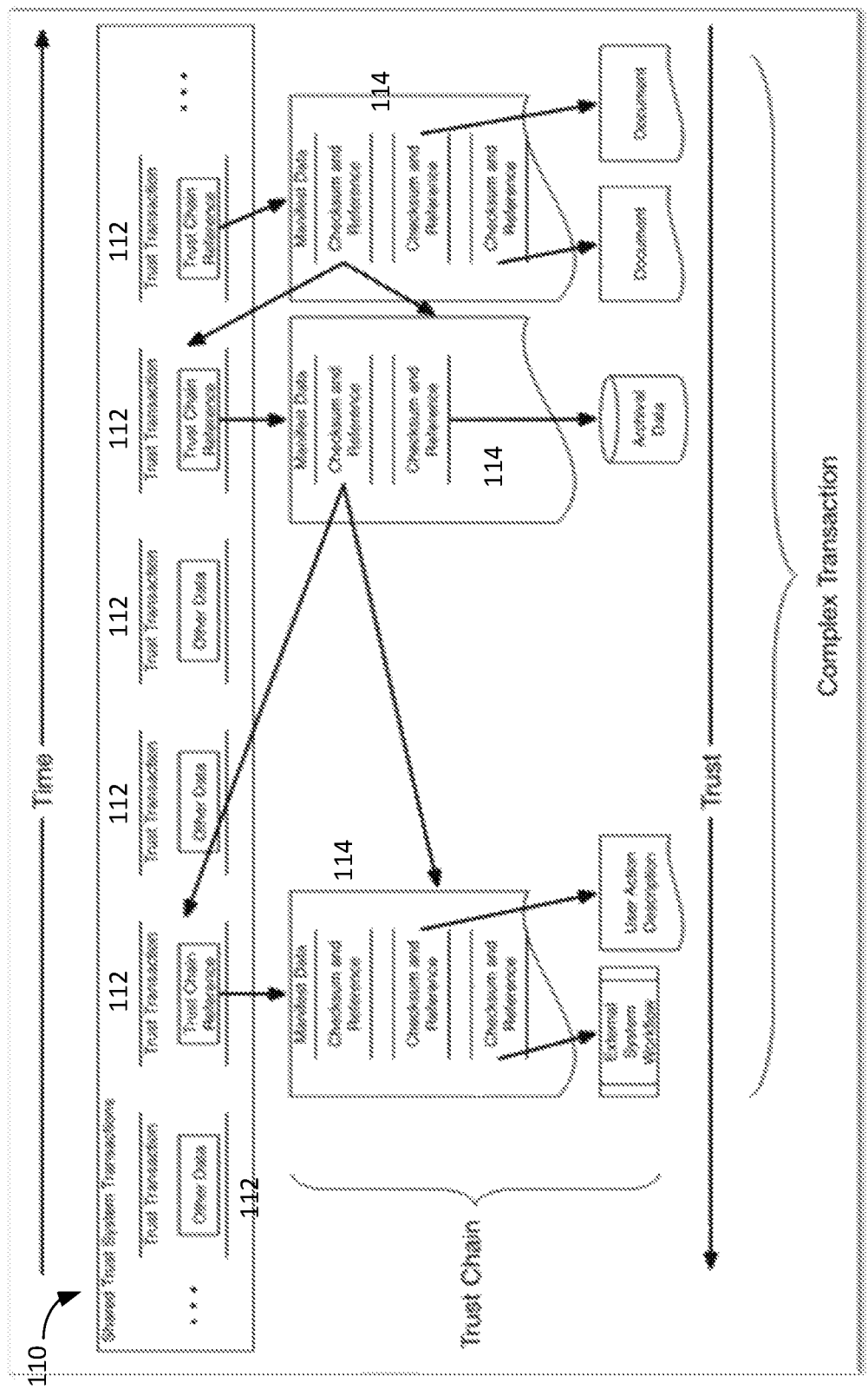
FIG. 2 is an example data structure associated with a complex transaction, such as may be generated by the systems of FIGS. 1A and/or 1B.

FIG. 1A is a schematic representation of a system operable to process, store, and/or reference events associated with a complex transaction, according to an embodiment. FIG. 1B is a logical schematic representation of the system of FIG. 1A, according to an embodiment. FIG. 2 is an example data structure associated with a complex transaction, such as may be generated by the systems of FIGS. 1A and/or 1B.

A complex transaction system 100 includes one or more cooperating computer systems (each having a processor and a memory) and associated software that, when executed, is operable to define and/or interpret data models representing a complex multi-step process, execute (or initiate the execution of) activities associated with the complex transaction, record the results of activities into event series data products 122, and/or store any related artifacts produced as a result of the activity in a repository for data products 120. In some instances, the complex transaction system 100 can commit transactions to a shared trust system 150. The shared trust system 150 can include, define, and/or manage a distributed ledger 110, such as the ethereum network. As discussed in further detail herein, transactions committed to the distributed ledger can include encrypted archives 112 that can contain manifest documents, data products (e.g., data files), and/or copies of or references to previous transactions. As discussed in further detail herein external trust system nodes 154 can be operable to validate contents of the archives 112 independently of the distributed ledger itself.

The complex transaction system 100 can include a complex transaction engine 1200. The complex transaction engine 1200 can include one or more cooperating software (executing on a processor) and/or hardware modules operable to execute sequencing, flow control, and/or messaging between a workflow interface 1210, an event series interface 1220, a distributed ledger interface 1230, a manifest data interface 1240, and/or an archival data interface 1250. The complex transaction engine 1200 can be operable to create archives 112 or trust transactions under programmatic control, for example, based on time-triggers, external programmatic inputs to the complex transaction engine 1200 (e.g., from an external system workflow 130), a manual interaction with a human user, or other external computer system process. The complex transaction engine 1200 can submit such archives 112 to the distributed ledger 110 for validation, e.g., via the distributed ledger interface 1230, such that the archives 112 are committed to the distributed ledger. The distributed ledger interface 1230 can further be operable to read transaction or other data from the distributed ledger.

Each archive 112 represents one or more manually-initiated or automatically-performed activities associated with the complex transaction (e.g., a dividend payment, an audit report, a regulatory filing, a share/security sale, etc.). Each archive 112 can be cryptographically encoded, affixed with appropriate tamper-proof data signatures, and/or committed to the distributed ledger over time as it is created. Archives can also include an archival data reference 1264 that uniquely identifies an information asset contained within the archive 112. Additionally, in some instances, an archive 112 can include a checksum 1268 of data held in the archive 112 and/or a checksum algorithm identifier (e.g., "SHA256").

As discussed in further detail herein, each archive 112 may contain, identify, and/or reference earlier transactions on the distributed ledger (e.g., earlier archives), earlier transactions that are maintained separately from the distributed ledger (e.g., an archive 112 can contain a reference to trust information, such as a verifiable cryptographic signature representing that a trusted transaction participant certifies that an activity occurred or the status of non-digital information), data products 120 associated with the current activity, a description of the current activity, and/or references to data products 120 associated with the current or previous activities that are maintained separately from the distributed ledger. The time series 110 of archives 112 represents part or all of the workflow of a complex transaction. The archives 112 store information related to the semantics of the complex transaction including, for example, information identifying authorized individuals performing or involved in activities, the result of activities, electronic data products produced by activities, instructions describing the conditions that caused the activity to occur, and/or instructions for simulating or recreating the activity.

The archival data interface 1250 of the complex transaction system can be operable to define, access, read, store, and otherwise provide a programmatic interface between the complex transaction engine 1200 and data products 120. The archival data interface 1250 can also be operable to define a look-up table that can allow a mapping between data products 120 (or indicators associated with data products 120) database keys, and unique intensifiers or names from external storage locations into a uniform series of identifiers. As discussed in further detail herein, data products 120 can be externally stored (e.g., stored off the distributed ledger), so the mapping of uniform identifiers to external references, which may be highly variable in form and/or structure, can allow archives 112 and/or manifest documents 114 to provide or reference immutable references to data products 120 whose storage locations may change over time. The archival data interface 1250 can also be operable to calculate and verify data checksums or fingerprints and report information on algorithms used to calculate such checksums or fingerprints.

The manifest data interface 1240 of the complex transaction system 100 can be operable to define a manifest document 114, which can be included within at least some archives 112. Similarly stated, at least some of the archives 112 can be decrypted to retrieve a manifest document 114, which can include the date and time 1262 that the manifest document 114 was created, data products, references to data products 1264, identifiers of persistent electronic locations of data products 1264, checksums of fingerprints for data products, which may be contained within or stored separately from the manifest document 114, workflow definitions that were executed to produce data products, checksums for workflow definitions, public-key signed references to individuals/electronic systems that performed actions associated with the event, references to distributed ledger transactions associated with prior events, and/or references to additional (e.g., prior) manifest documents 1266.

As discussed above, archives 112 can be committed to a distributed ledger system as they are created. Similarly stated, each archive 112 can be submitted to the distributed ledger such that a copy of the archive is stored in a block of each copy of the distributed ledger maintained by local trust system nodes 152 (e.g., computer systems participating in the distributed trust system 150), ensuring the immutability of the archive. Thus, an archive 112 can include an encrypted manifest document 114, a reference to a manifest document 114, a signature of a manifest document 114, a unique activity identifier, and/or the activity date. The distributed ledger therefore establishes a public, ledger-based trusted, immutable time series record of the activities that make up a complex transaction. As discussed in further detail herein, each manifest document 114 can reference related manifests and/or activities that were generated or occurred earlier in time and previously committed to the distributed ledger.

Because manifest documents 114 can include references to earlier manifest documents 114 that are stored on the distributed ledger, for example, by identifying a location on the distributed ledger where an archive 112 containing an earlier manifest document 114 can be located, a trust chain can be created independently of the distributed ledger. A manifest document 114 can further include a checksum, fingerprint, or other description of an earlier manifest document 114 such that that earlier manifest document 114 can be uniquely identified. In this way, a series of manifest documents 114, where each manifest document 114 references at least one previous manifest document 114 creates a trust chain that is not dependent on the distributed ledger itself. Similarly stated, even in the absence of the distributed ledger, an individual with access to the series of manifest documents 114 could have confidence that the series of manifests represents an unchanged accounting of the complex transaction because each manifest uniquely identifies (e.g., through a fingerprint or checksum) at least one previous manifest. The trust chain that is independent from the distributed ledger can extend arbitrarily far back in time, for example to the origination of the complex transaction. The series of manifest documents 114 can represent the time linear flow of activities and transactions related to the complex transaction that culminates in the final manifest document 114, which can represent the most recent activity that occurred in the complex transaction and/or that was committed to the distributed ledger.

The workflow interface 1210 of the complex transaction system 100 can provide a programmatic interface between the complex transaction system engine 1200 and external system workflows 130. The external system workflow can be a compound data structure configured to model a sequence of events to be performed to execute a complex transaction. Such data models may define computational actions to perform, steps to be performed by a human participant, transformations to be applied to data products, and/or transactions to be performed with external systems. The workflow interface 1210, therefore, can be operable to invoke external workflow steps, receive data describing (externally) executed steps, and the results of (externally) executed steps for subsequent use by the event series interface 1220 in persisting the results of the workflow execution.

The event series interface 1220 can provide a programmatic interface between the complex transaction engine 1200 and the event series data store 122. The event series data store 122 can be computer-readable data structure, such as a keyed, indexed, or relational database that may be configured for creation, reading, updating, and/or deleting event series records. The event series data store 122 can be operable to store a series of data records that record data and time of activities of the complex transaction, references to participants (human users and/or automated systems) involved in the complex transactions, actions performed in an external system workflow 130, references to data products 120, and so forth.

Figure 3:
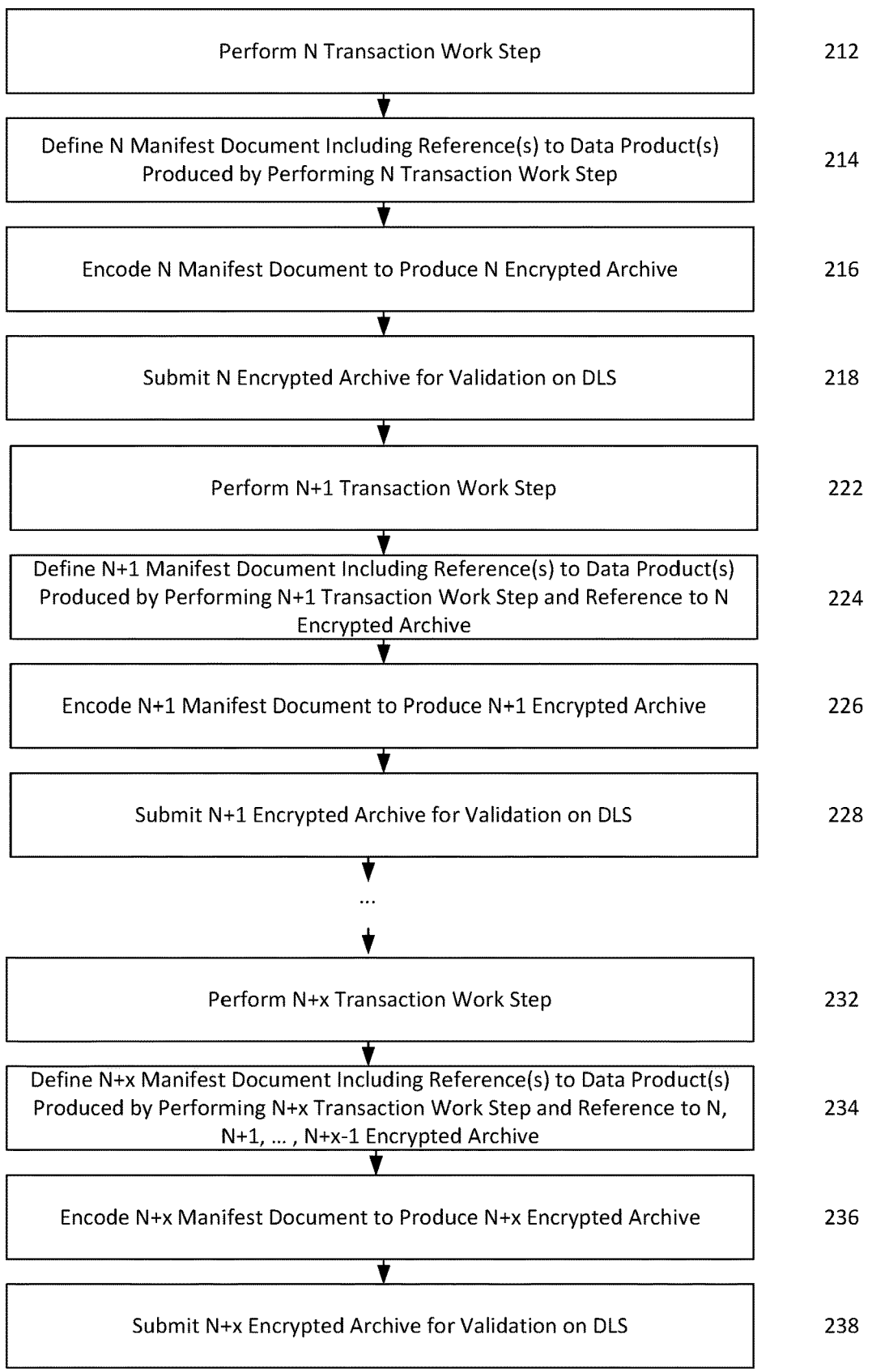
FIG. 3 is a flow chart of a method for representing a complex transaction as cryptographically secure data, according to an embodiment.
Figure 6:
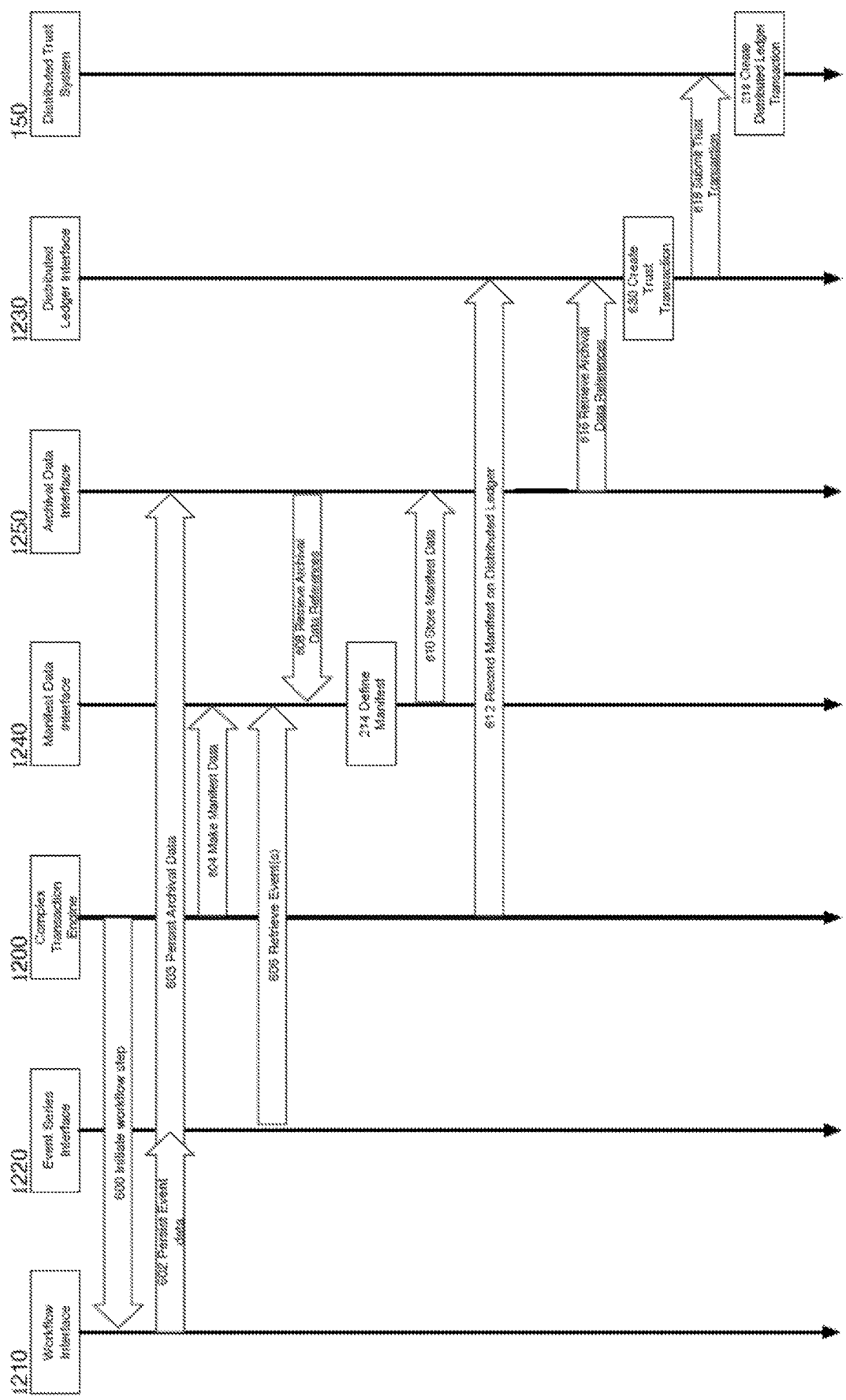
FIG. 6 is a signal diagram illustrating a method for representing a complex transaction as cryptographically secure data, according to an embodiment.

FIG. 3 is a flow chart and FIG. 6 is a signal diagram of a method for representing a complex transaction as cryptographically secure data, according to an embodiment. FIG. 6 refers to the workflow interface 1210, the event series interface 1220, the complex transaction engine 1200, the manifest data interface 1240, the archival data interface 1250, and the distributed trust system 110 shown and described above with reference to FIG. 1B. FIG. 3 is described in conjunction with FIG. 6 for ease of description, but it should be understood that the method of FIG. 3 can be performed on any suitable system, including systems that may not include all the structures and/or functionality of the system of FIG. 1B.

At 212, a first (N) transaction work step can be performed. For example, the complex transaction engine 1200 can initiate the first (N) workflow step by sending a signal 600 to the workflow interface 1210. Typically a first (N) transaction work step will be an origination event, although it should be understood that in some instances the first transaction work step may refer to an action or transaction of an already-existing complex transaction or an action or transaction that predates the origination of a complex transaction, such as preliminary actions or transactions that a contemplated complex transaction will reference or incorporate. In some instances, the first (N) transaction work step can be the execution of a smart contract. For example, a smart contract configured to initiate the complex transaction can be defined and submitted to a distributed ledger. When the conditions associated with the smart contract are satisfied, the smart contract can automatically execute causing the complex transaction to initiate, for example, by defining and distributing tokens associated with the complex transaction.

The first transaction work step will typically create, rely on, and/or reference one or more data products. For example, the first (N) transaction work step may reference one or more assets (e.g., deeds, notes, supply contracts, etc.), may create tradeable shares or tokens (e.g., ownership interests in asset(s)), may include origination documents describing the terms and conditions of the complex transaction, may distribute shares or tokens to stakeholders, and so forth. Some data products may be created automatically, for example through the execution of a smart contract, while other data products may be created manually, for example through legal or financial drafting. Data products can be stored on or represented on a distributed ledger (e.g., tokens, smart contracts, etc.), in traditional electronic data repositories (e.g., on a secure server, on a cloud-based data repository, on a local storage device, etc.), or maintained in physical form (e.g., original deeds or notes). A data product can also describe steps to be taken to perform a transaction work step and/or conditions that caused the transaction work step to be performed.

The workflow interface 1210 can send signals 602 and/or 603 to the event series interface 1220 and/or archival data interface 1250, respectively, which can be operable to cause the event series interface 1220 and/or the archival data interface 1250 to store data products created, relied on, or referenced by the first (N) transaction work step. Specifically, the event series interface 1220 can cause data products to be stored to the distributed ledger 110 and/or the archival data interface 1250 can be operable to cause data products to be stored to a non-distributed ledger data repository.

At 214, a first (N) manifest document can be defined. The first (N) manifest document can be defined by the complex transaction engine 1200 sending signal 604 to the manifest data interface 1240. Furthermore, the manifest data interface 1240 can retrieve activity from the event series interface 1220 and/or the archival data interface 1250 as shown as signals 606 and 608, respectively.

The first (N) manifest document can include or reference data products defined, relied on, or referenced by the first transaction work step. The first (N) manifest document can also include a description of the activity that caused the first (N) manifest document to be defined. For example, in some instances, the first manifest document can include a list of checksums, hashes, and/or fingerprints suitable to identify each data product defined, relied on, or referenced by the first transaction work step. In some instances a complete copy of some or all data products associated with the first transaction work step can be incorporated into or packaged with the first manifest document. In some instances, a data product can identify a location on a distributed ledger or other data storage system where a data product can be located. In some instances, a data product can identify an authorized user or entity. Another type of data product can include an authorized user/entity certifying, for example through a cryptographic signature, the status of an asset. A certification by an identified and authorized user/entity is particularly well suited for non-digital data products or assets. For example, a bank or broker can certify that a physical asset or an original note or deed is in its possession and make representations regarding the contents or status of that asset. The first (N) manifest document can reference different data products in different ways (e.g., a complete copy of one data product can be incorporated into the manifest, while a digital fingerprint and metadata description of another data product can be listed). It should also be understood that some data products may be identified in the manifest by multiple techniques, such as by including a complete copy of the data product into the manifest and referencing an external data source (e.g., a blockchain location, a SEC document identifier, etc.). In some instances, the distributed ledger interface 1230 can be operable to retrieve data products (signal 616) from the distributed ledger interface 1230 based on a reference or indicator associated with data product(s), which can be included in the first (N) manifest document as an archival data reference 1264.

At 216, the first (N) manifest document and/or data products associated with the first (N) manifest document can be encoded to produce a first (N) encrypted archive. At 218, the first (N) encrypted archive can be submitted for validation on a distributed ledger system, such as the ethereum network. For example, the complex transaction engine 1200 can send signal 612 to the distributed ledger interface 1230 to cause the distributed ledger interface 1230 to create a trust transaction (e.g., an ERC-20 token) at 630 and to send signal 618 to the distributed trust system 110 to cause the distributed trust system 110 to validate the trust transaction. The distributed ledger can validate the first (N) encrypted archive, committing it to the distributed ledger. In addition or alternatively, the manifest data interface 1240 can be operable to send signal 610 to the archival data interface 1250 to cause the archival data interface 1250 to cause the encrypted archive to be stored in a non-distributed ledger data repository.

Events similar to those described above with reference to 212, 214, 216, and/or 218 can be repeated any number of times for each activity associated with the complex transaction. For example, at 222, a second (N+1) transaction work step can be performed, which can be similar to the first (N) transaction work step performed at 212. The second transaction work step can define, reference, and/or rely upon additional data products and/or can be associated with previously referenced data products (e.g., data products associated with the first (N) transaction work step performed at 212). As illustrated at 232, another (N+x) transaction work step can be performed. Again, the N+x transaction work step can define, reference, and/or rely upon new or previously generated data products. Work steps can include, for example, generating documents, logging a document into a data repository (e.g., other than a distributed ledger), detecting that an individual has accessed a document stored in a data repository, verifying that an investor is accredited (e.g., a compliance officer can certify that an investor is accredited), registering a payment against a debt instrument, paying a dividend to an investor, transferring an ownership stake (or token) from one entity or compute device to another entity or compute device, and so forth.

Similar to the defining the first (N) manifest document at 214, a manifest document that includes or references data products associated with each transaction work step (e.g., the N+1 transaction work step, the N+x transaction work step) can be defined at 224 and 234. Each manifest document can include or reference a previous manifest document. Because manifest documents are created as the complex transaction unfolds, manifest documents may not reference future or not-yet-defined manifest documents. For example, the second (N+1) manifest document can include or reference the first (N) manifest document. A third (N+2) manifest document (not shown) can include or reference the second (N+1) manifest document, and so forth. In some instances, a manifest document can include or reference all previous manifest documents (e.g., the third manifest document can include or reference the second (N+1) manifest document and the first (N) manifest document). In other instances a manifest document may only reference an immediately previous manifest document.

Typically each manifest document will be associated with multiple activities of the complex transaction, although in some instances a manifest document will be associated with only a single activity or work step. Typically a manifest document will be associated with all work steps or activities that have occurred since the last manifest document was defined. For example, work steps and/or data products can be batched such that one manifest document references multiple work steps and/or data products. For example, manifest documents can be automatically defined daily, weekly, or on any other suitable pre-defined schedule. In addition or alternatively, a manifest document can be defined in response to a manually initiated process, for example in response to an important or critical work step having been performed (e.g., deal closing, regulatory approval, etc.).

At 226 and 236, manifest documents defined at 224 and 234 and/or data products associated with those manifest documents can be can be encoded to produce encrypted archives. At 228 and 238, such encrypted archives can be submitted for validation on a distributed ledger system. Typically, each encrypted archive will be recorded on a single distributed ledger, but in some embodiments, at least some encrypted archives can be recorded on different distributed ledgers. For example, one encrypted archive can be recorded on the public ethereum ledger, another encrypted archive can be recorded on another ledger (optionally operating under a different protocol, such as ripple), and another encrypted archive can be recorded on a private ethereum ledger. Thus, each encrypted archive can be recorded to an immutable block of a distributed ledger. Batching data products and/or work steps as discussed above can reduce the number of blocks written to the distributed ledger, which can reduce transaction costs and allow the ledger to be used more efficiently. Similarly stated, cost and computational resource savings can be realized by defining manifests that selectively batch data products and work steps. For example, in some instances, activities associated with the complex transaction can occur faster than blocks are written to the distributed ledger. Defining a manifest that includes or references a batch of work steps and data products can enable data generated according to a relatively fast-moving process (the complex transaction) to be recorded on a relatively slow-moving data record (the distributed ledger).

In some embodiments, encrypted archives and/or manifest documents can themselves be stored as data products on a non-distributed ledger storage system. In this way, the parallel storage strategies (on the distributed ledger and off the distributed ledger) can improve data resiliency and reduce the possibility of data loss (for example, if an archive is not accepted to the distributed ledger). Similarly stated, after a manifest document is defined and/or encrypted, one copy of the manifest document can be stored in a traditional data repository (e.g., local or cloud storage) and another copy of the manifest document can be recorded to the distributed ledger. As discussed above, because each manifest document can reference one or more previous manifest documents, the manifest documents can establish a chain of trust that is independent of the distributed ledger.

Figure 4:
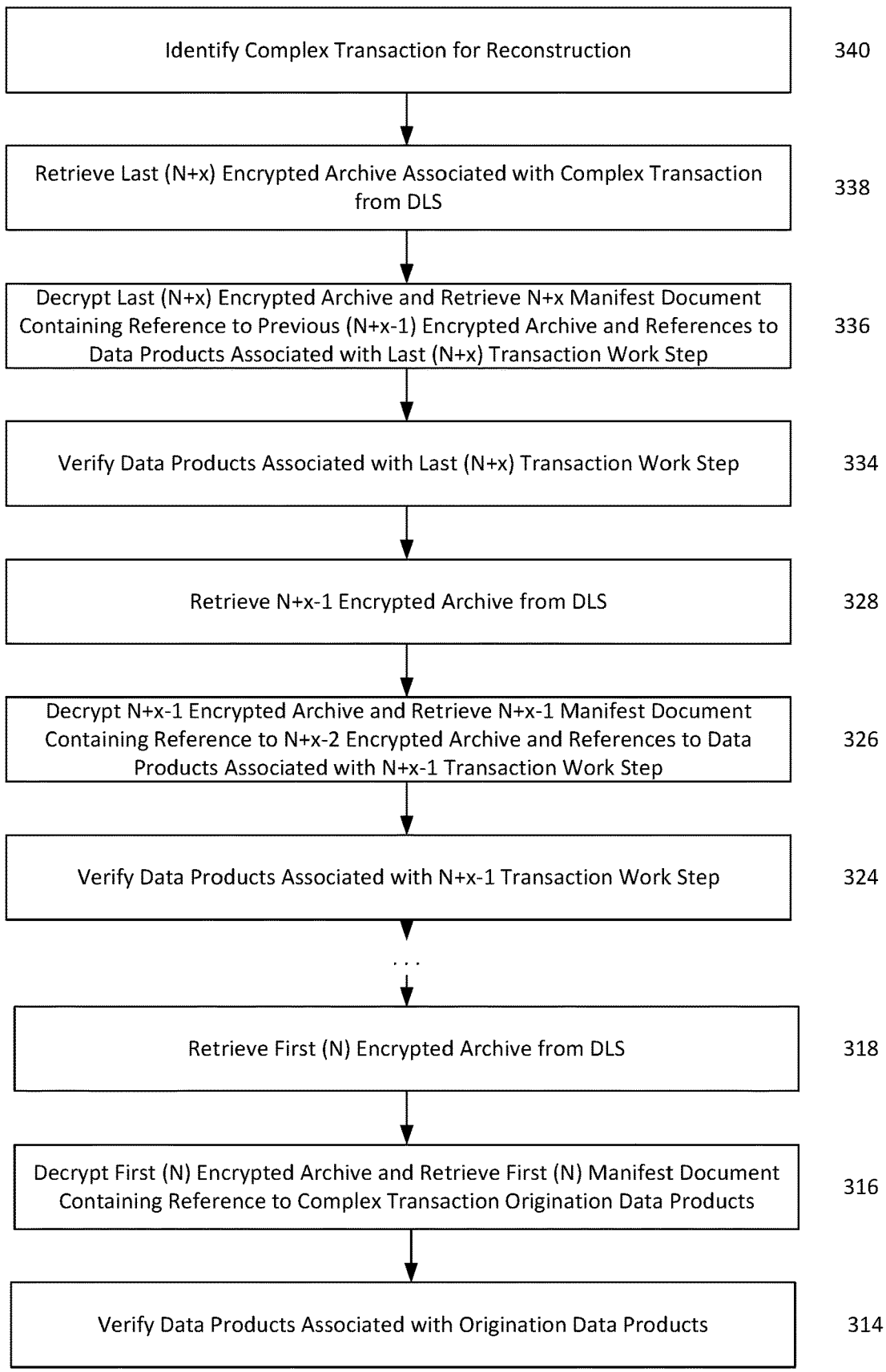
FIG. 4 is a flow chart of a method for processing cryptographically-secured data stored in a distributed ledger and data products stored off the distributed ledger to reconstruct a complex transaction, according to an embodiment.
Figure 7:
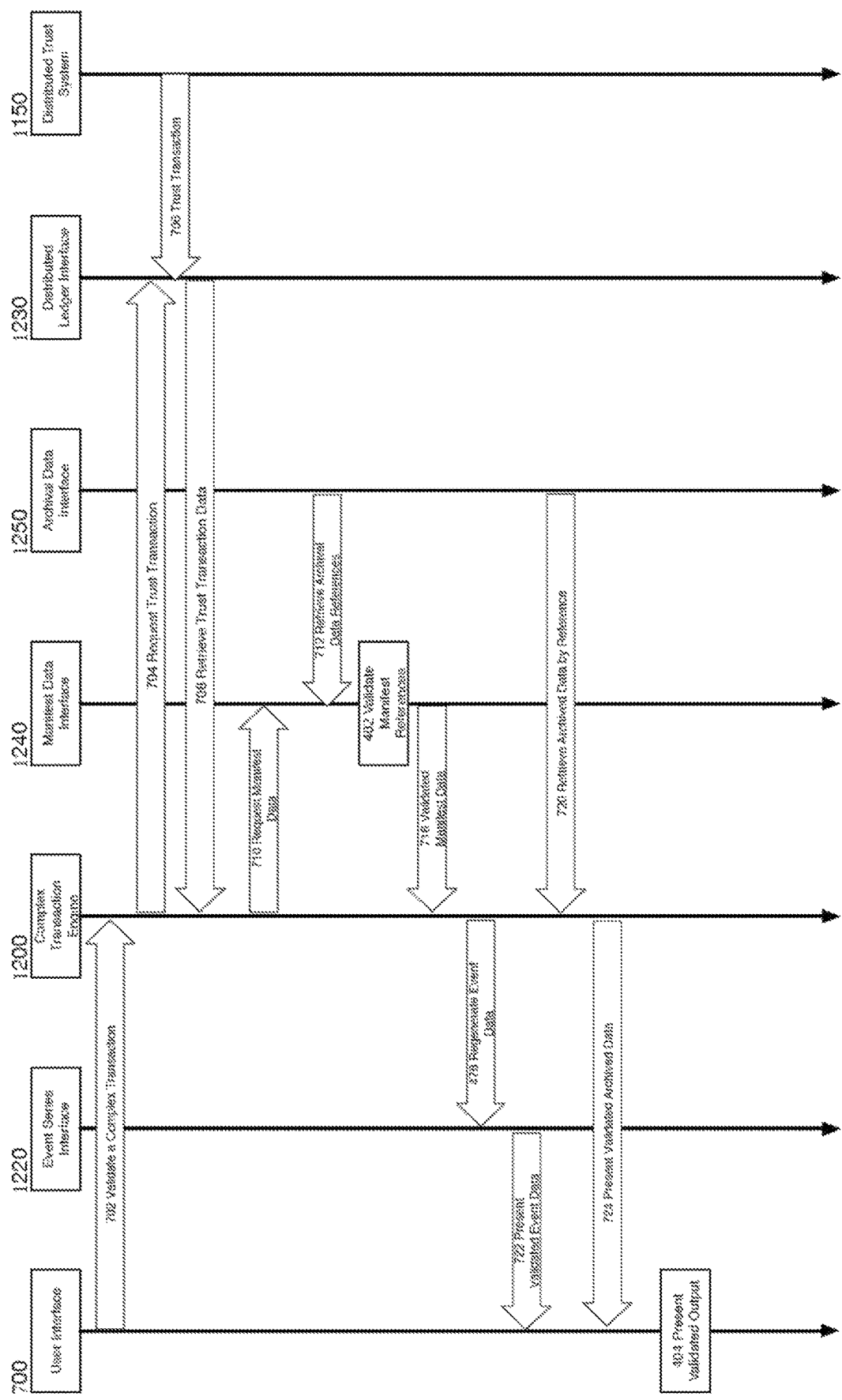
FIG. 7 is a signal diagram illustrating a method for processing data stored in a distributed ledger and data products stored off the distributed ledger to reconstruct a complex transaction, according to an embodiment.

FIG. 4 is a flow chart and FIG. 7 is a signal diagram of a method for processing cryptographically-secured data stored in a distributed ledger and data products stored off the distributed ledger to reconstruct a complex transaction, according to an embodiment. FIG. 7 refers to the event series interface 1220, the complex transaction engine 1200, the manifest data interface 1240, the archival data interface 1250, and the distributed trust system 110 shown and described above with reference to FIG. 1B. FIG. 4 is described in conjunction with FIG. 7 for ease of description, but it should be understood that the method of FIG. 4 can be performed on any suitable system, including systems that may not include all the structures and/or functionality of the system of FIG. 1B.

The method described above with reference to FIG. 3 describes an embodiment by which archives associated with events of a complex transaction can be stored on a distributed ledger system. The method shown in FIG. 4 generally relates to an embodiment by which such archives can be "unpacked" and, optionally, combined with other data stored on a distributed ledger and/or data stored off the distributed ledger to understand, recreate, simulate, verify, audit, study, etc. the complex transaction.

At 340 a complex transaction can be identified. In some embodiments, the complex transaction can be identified by a reference to the complex transaction in a token associated with the complex transaction. For example, an individual or entity involved in the transaction (e.g., a shareholder, trader, payee, etc.) can be in possession of a token that establishes that individual or entity's interest in the complex transaction. In some instances, an individual involved in the transaction or an analyst studying the transaction (e.g., an auditor, an individual conducting diligence on the complex transaction, a financial advisor, etc.) can select a complex transaction for validation via a user interface 700, for example by selecting an icon representing a token, a manifest document or encrypted archive associated with the complex transaction (e.g., retrieved from a non-distributed ledger data repository) or selecting a representation of any other suitable artifact associated with the complex transaction.

At 338, an encrypted archive associated with the complex transaction can be retrieved from a distributed ledger. For example the complex transaction engine 1200 can receive an indication of the complex transaction 702 from the user interface 700, send signal 704 to the distributed ledger interface 1230, such that the distributed ledger interface 1230 accesses the distributed ledger 110 and retrieves 706 the encrypted archive, which can be returned 708 to the complex transaction engine 1200.

Typically the first encrypted archive associated with the complex transaction to be retrieved will be the last (N+x) encrypted archive committed to the distributed ledger. Similarly stated, typically reconstructing a complex transaction will begin by retrieving an encrypted archive associated with the most recent activity in the complex transaction. It should be understood, however, that in some instances, reconstructing a complex transaction (or a portion of a complex transaction) can begin with an archive associated with any activity (not necessarily the last or most recent activity) in the complex transaction.

At 336, the (N+x) archive can be decrypted. In some instances, a token that establishes an individual or entity's interest in the complex transaction can include a decryption key by which data associated with the complex transaction can be retrieved. Similarly stated, a token (e.g., a ERC-20 token) that connotes ownership or interest in a complex transaction or security can include a decryption key by which archives associated with the complex transaction can be decrypted. In this way, individuals and/or entities associated with the complex transaction can be empowered to access, examine, validate, audit, etc. archives of the complex transaction. Similarly stated, a digital token can act as a reference to one or more trust chains. For example, a token can act as a reference to a chain of encrypted archives stored in the distributed ledger by virtue of the token and one or more of the encrypted archives having a common parent (e.g., a smart contract). As discussed in further detail herein, this can enable individuals and entities with an interest in the complex transaction to verify a chain of trust back to the origination of the complex transaction. In some instances a token connoting an ownership interest in a complex transaction can include a decryption key operable to decrypt all archives associated with the complex transaction. In other instances at least some tokens connoting an interest in a complex transaction can be more limited and operable only to decrypt some archives associated with the complex transaction. For example, access to highly sensitive or confidential data may be restricted from some token holders.

By decrypting the last (N+x) archive a last (N+x) manifest document and/or data products associated with the last (N+x) manifest document can be retrieved. As discussed above with reference to event 234, the last (N+x) manifest document can contain or reference an immediately-previous manifest (N+x−1) associated with an immediately previous (N+x−1) activity in the complex transaction and/or other earlier manifests associated with other earlier activity in the complex transaction, optionally dating back to a first (N) manifest document associated with an origination (N) of the complex transaction.

Furthermore, as discussed above with reference to events 214, 224, and 234, manifest documents can include or reference data products associated with the complex transaction. For example, the last (N+x) manifest document can describe (optionally, in computer executable form) the conditions that caused an activity associated with the last (N+x) manifest document to be defined. Additionally, the last (N+x) archive and/or manifest document can include or reference data products that were defined as a result of or otherwise associated with the last (N+x) activity in the complex transaction. The last (N+x) manifest document can include or reference data products stored on the distributed ledger from which the last (N+x) archive was retrieved, can reference data products stored in other locations, and/or can include a certification by an identified and authorized user/entity as to the content and/or status of an asset or data product. Manifest documents can further reference one or more tokens that are operable to decrypt archives, for example by name and/or token symbol. In some such embodiments, the relationship between such tokens and archives/manifest documents may be bidirectional. The complex transaction engine 1200 can be operable to send signal 710 to the manifest data interface 1240 to cause the manifest data interface 1240 to retrieve 712 data products from their storage location(s).

As discussed above, an activity associated with the complex transaction can define, reference, or rely upon a wide variety of data products, such as transaction records, audit reports, regulatory filings, and so forth. At 334, data products referenced by or incorporated in the last (N+x) archive and/or manifest document can be verified by any suitable means. For example, certifications by identified and authorized individuals or entities can be checked to verify the identity of the authorized individuals using a public/private key signature verification technique, certifications can be checked against primary documentation, the existence and/or content of expected/required audit reports or regulatory filings can be reviewed, and so forth. If evidence of tampering is revealed, for example, if an "authorized" cryptographic signature cannot be verified, if expected data products are missing, or so forth, an alert can be generated such that a further investigation into the irregularity can be conducted.

Because manifest documents (other than the first (N) manifest document) each reference at least one previous manifest document, an individual, entity, or compute device with sufficient permissions having a single manifest document can walk up the chain of trust established by manifest-to-manifest references to recreate the entire complex transaction from that manifest document to the origination of the complex transaction. Similarly stated, each manifest document will allow an individual, entity, or compute device to identify where a pervious manifest document is stored. If that individual, entity, or compute device has access to the storage location (e.g., has a decryption key that can decrypt an archive stored on a distributed ledger or has access to a password-protected data repository containing manifest documents), that individual, entity, or compute device can move from manifest-reference to manifest reference to retrieve all the manifests for the complex transaction. Furthermore, because each manifest document can contain a checksum or fingerprint of at least one previous manifest, an individual, entity, or compute device reading manifest documents can be assured that if the fingerprint or checksum of that manifest document matches the fingerprint or checksum reported in a subsequent manifest document then that manifest document has not been altered any time after the subsequent manifest document was defined.

Therefore, based on a reference contained in the last (N+x) manifest document, a previous (N+x−1) encrypted archive can be identified, retrieved from the distributed ledger, and decrypted, at 326, such that a previous (N+x−1) manifest document and/or associated data products can be retrieved. Events 328 and 326 can be similar to events 338 and 336 discussed above. At 324, the previous (N+x−1) manifest document can be verified by computing a hash or fingerprint on the previous (N+x−1) manifest and comparing that hash or fingerprint against a hash or fingerprint reported in the last (N) manifest document. In addition or alternatively, at 324, data products identified by or incorporated in the previous (N+x−1) manifest document can be verified. In instances in which data products or transactions identified in the last (N+x) manifest document depend upon actions or data products that were supposed to have occurred or be associated with an activity associated with the previous (N+x−1) manifest document, the occurrence of such actions and/or existence/contents of such data products can be verified. For example, if the last (N+x) manifest document indicates a payment to a shareholder was made, the previous (N+x−1) manifest document (and/or associated data products) can be checked to verify that the shareholder was a shareholder in good standing and entitled to a payment at the time the previous (N+x−1) manifest document was generated. Again if verification fails, an alert can be generated such that a further investigation into the irregularity can be conducted.

In some instances, if a chain of trust is broken, for example, if an expected archive is missing from the distributed ledger or off-ledger data repository, an alert can be generated, but the transaction can be validated based on redundantly stored data. Such redundantly stored data can, in some instances, be validated using a hash or checksum recorded in a later manifest document. For example, if an encrypted archive containing the previous (N+x−1) manifest document is not located on the distributed ledger in the expected location, the previous (N+x−1) manifest document can be retrieved from a non-distributed ledger data repository. The last (N+x) manifest document can contain a checksum or hash of the previous (N+x−1) manifest document, which can be used to validate the copy of the previous (N+x−1) manifest document that was retrieved from a non-distributed ledger (e.g., non-immutable) data repository.

This process can be repeated indefinitely, for example, until a first (N) encrypted archive associated with the complex transaction is retrieved from the distributed ledger at 318. The first encrypted archive can be decrypted to retrieve a first (N) manifest document, at 316. Typically the first (N) manifest document will be associated with an origination of the complex transaction and incorporate or reference origination data products. It should be understood, however, that in some instances, the first manifest document may not be associated with origination of a complex transaction. Similarly stated, in some embodiments, data associated with a complex transaction can be first committed to a distributed ledger sometime after or sometime before the complex transaction was initiated. Data products associated with the first (N) manifest document can be verified at 314.

Figure 5:
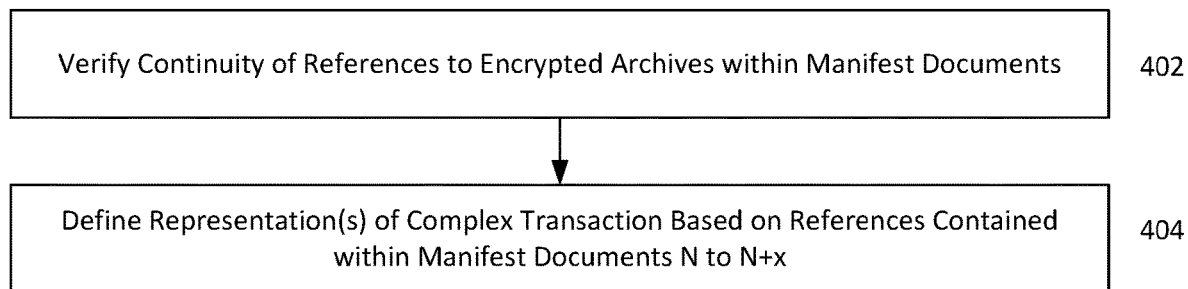
FIG. 5 is a flow chart of a method of simulating, replaying, and/or verifying a complex transaction, according to an embodiment.

FIG. 5 is a flow chart of a method of simulating, replaying, and/or verifying a complex transaction, according to an embodiment. In some instances, the method of FIG. 5 can be performed in conjunction with the method described above with reference to FIGS. 4 and 7. For example, the manifest documents retrieved during the performance of the method of FIG. 4 and/or the data products referenced and/or included in the manifest documents can be used during the performance of the method of FIG. 5.

As discussed above, each manifest document encrypted and committed to the distributed ledger as an archive can be associated with an activity of the complex transaction. Furthermore, the distributed ledger can ensure that each manifest document is permanently and immutably stored. Additionally, each manifest document can reference one or more previous manifest documents (including, for example, a checksum or fingerprint of the previous manifest document(s)), establishing a chain of trust that is not dependent upon the distributed ledger. Thus, performing the method of FIG. 4 can allow an individual or entity to obtain a manifest document for each activity that has occurred in a complex transaction from a first (N) activity to a last (N+x) activity.

At 402, a continuity of references to encrypted archives can be verified. As discussed above, each manifest document can include a reference to and/or unique description (e.g., a fingerprint or checksum) of one or more previous encrypted archives committed to the distributed ledger. Therefore at 402, a chain of activities of the complex transaction can be verified by sequentially verifying that an unbroken chain of manifest documents exists. Similarly stated, the last (N+x) manifest document can be examined to identify the location of the next-to-last (N+x−1) archive on the distributed ledger, which can be decrypted to retrieve the next-to-last (N+x−1) manifest document. The next-to-last (N+x−1) manifest document can in turn be examined to identify the location of the second-next-to-last (N+x−2) archive on the distributed ledger and so on and so forth, until the second (N+1) archive is decrypted to retrieve the second (N+1) manifest document. The second (N+1) manifest document can reveal the location of the first (N) archive, which can be decrypted to retrieve the first (N) manifest document, which can include or reference the origination data products of the complex transaction.

At 404, a representation of the complex transaction can be replayed or simulated by retrieving the origination data products from the first (N) manifest document, then identifying an activity associated with the second (N+1) manifest document, which may include reviewing, executing, verifying, or otherwise analyzing data products contained within or referenced by the first (N) and/or second (N+1) manifest document. For example, as shown with reference to FIG. 7, the complex transaction engine 1200 can retrieve 716, 720 validated manifest data and data products from various data repositories. This process can be repeated indefinitely until an activity associated with the last (N+x) manifest document is identified. Trust and validity of the current state of the complex transaction can be verified by replaying and/or simulating each action that caused a manifest document to be generated, encrypted, and committed to the distributed ledger (e.g., as described above with reference to FIG. 3). Furthermore, because the manifest documents can include or reference each data product or artifact associated with each activity in the complex transaction, a complete description of the state of the complex transaction at any point in time can be recreated, visualized, and/or otherwise analyzed. The manifest documents can also be operable to provide a fingerprint or checksum of each externally stored data (e.g., data products not stored on the distributed ledger) such that an analyst can be assured that external data products remain intact and unmodified from their initial creation. The manifest documents can further include a description of each activity that caused that manifest document to be defined and/or code operable to cause a simulation of each activity to be executed.

The full complex transaction from first activity to most recent activity, or the complex transaction at any point in time can thereby be expressed as a human readable narrative describing the complex transaction, computer-executable instructions to simulate the complex transaction at a future time, examine a state of the complex transaction under counter-factual conditions (e.g., if an activity such as a trade had not occurred or had occurred differently) and so forth. The simulation of the complex transaction can be used to produce compliance reports for governmental regulators or any other suitable report for any suitable party. The simulation of the complex transaction can be used to present a redacted view of the transaction, for example, to preserve confidential or proprietary data associated with the complex transaction. As shown in FIG. 7, signals 722 and 724 represent that the user interface 700 can present data received from the complex transaction engine 1200 and/or the event series interface 1220, respectively.

The above-described methods can be performed on compute devices, such as client computer devices, servers, mainframe computers, etc. For example, the distributed trust system can be implemented on one or more servers interconnected by a network such as a wireless network(s), wired network(s), the Internet, an intranet(s) and/or any combination thereof. For other examples, the execution of complex multi-step transactions, the production of transaction records, the cryptographically encoding of those transaction records, the affixing of appropriate tamper-proof data signatures, and the submission of such information to a distributed trust system can be performed by user compute devices (e.g., client devices) that operatively coupled to the distributed trust system via the above-described network. Similarly, any reconstruction of the complex multi-step transactions and representation of the related data can be performed by the user compute devices accessing the distributed trust system.

It should be understood that each compute device can include a processor and a memory operatively coupled to that processor. Such a memory can be a non-transitory computer-readable medium (also can be referred to as a non-transitory processor-readable medium or memory) having instructions or computer code thereon for performing various computer-implemented operations and for execution by the processor. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. An apparatus, comprising:
a first compute device, including a non-transitory processor readable memory and a processor, the first compute device included within a plurality of compute devices that collectively implement a distributed database via a network that operably couples the plurality of compute devices,
the non-transitory processor readable memory storing a first instance of the distributed database, the first instance of the distributed database including a first manifest document; and
the processor operatively coupled to the non-transitory processor readable memory, the processor configured to:
receive an indication of a second manifest document from a second compute device that stores a second instance of the distributed database, the second compute device being from the plurality of compute devices, the second instance of the distributed database including the second manifest document, the second manifest document containing a reference to the first manifest document and a unique signature of the first manifest document,
commit the second manifest document to the first instance of the distributed ledger based on receiving the indication of the second manifest document from the second compute device,
validate a continuity between the first manifest document and the second manifest document based on the second manifest document containing the reference to the first manifest document and the first manifest document matching the unique signature of the first manifest document contained within the second manifest document such that the unique signature of the first manifest document ensures that the first manifest document and the second manifest document are unchanged since the second manifest document was defined, and
retrieve the first manifest document from the first instance of the distributed database based on the reference to the first manifest document in the second manifest document.

2. The apparatus of claim 1, wherein the second manifest document includes a reference to a data product, and the processor is further configured to:
retrieve the data product from a data storage system that is different from the distributed database; and
validate the continuity between the first manifest document and the second manifest document based, at least in part, on the data product.

3. The apparatus of claim 1, wherein:
the second manifest document uniquely identifies a plurality of manifest documents including and in addition to the first manifest document; and
the processor is further configured to:
validate a continuity of the plurality of manifest documents based on each manifest document from the plurality of manifest documents uniquely identifying at least one previous manifest document; and
reconstruct activities of a complex transaction based on the plurality of manifest documents.

4. A non-transitory processor readable medium storing code representing instructions configured to be executed by a processor, the code comprising code to cause the processor to:
receive a token associated with a complex transaction, the token including a reference to a first encrypted archive recorded in a distributed ledger;
decrypt the first encrypted archive using the token to retrieve a first manifest document, the first manifest document generated in response to an occurrence of a first activity of the complex transaction, the first manifest document identifying a second encrypted archive;
decrypt the second encrypted archive using the token to retrieve a second manifest document, the second manifest document generated in response to an occurrence of a second activity of the complex transaction, the second manifest document including a reference to a data product;
retrieve the data product based on the reference to the data product in the second manifest document; and
verify continuity of the complex transaction between the second activity and the first activity based on the data product.

5. The non-transitory processor readable medium of claim 4, wherein the first manifest document identifies a location on the distributed ledger from which the second encrypted archive can be retrieved.

6. The non-transitory processor readable medium of claim 4, wherein the first manifest document identifies a data store other than the distributed ledger from which the second encrypted archive can be retrieved.

7. The non-transitory processor readable medium of claim 4, wherein:
the second manifest document includes at least one of a checksum or a hash of the data product,
the data product is retrieved from a data store other than the distributed ledger,
the code further comprising code to cause the processor to:
verify that the data product has not been changed since the second manifest document was defined based on the data product producing the at least one of the checksum or the hash when subjected to an algorithm associated with the at least one of the checksum or hash.

8. The non-transitory processor readable medium of claim 4, wherein the data product at least partially defines a state of the complex transaction at a time associated with the second activity, the code further comprising code to cause the processor to:
verify that the first activity is consistent with the state of the complex transaction at the time associated with the second activity.

9. The non-transitory processor readable medium of claim 4, wherein the first manifest document and the second manifest document are from a plurality of manifest documents, each manifest document from the plurality of manifest documents other than an origination manifest document referencing at least one other manifest document from the plurality of manifest documents, each manifest document from the plurality of manifest documents associated with an activity in the complex transaction, the code further comprising code to:
retrieve the plurality of manifest documents;
define a representation of the complex transaction based on the plurality of manifest documents.

10. The non-transitory processor readable medium of claim 4, wherein the token represents an ownership interest in an asset associated with the complex transaction.

11. The non-transitory processor readable medium of claim 4, the code further comprising code to cause the processor to transfer the token to a wallet stored on a compute device such that the compute device is configured to decrypt the first encrypted archive using the token.

12. The non-transitory processor readable medium of claim 4, wherein the first manifest document includes a reference to a location on the distributed ledger that contains the second archive.

13. The non-transitory processor readable medium of claim 4, wherein:
the distributed ledger is a first distributed ledger; and
the first manifest document includes a reference to a location on a second distributed ledger that contains the second archive, a protocol of the second distributed ledger being different from a protocol of the first distributed ledger.

14. The non-transitory processor readable medium of claim 4, the code further comprising code to cause the processor to:
retrieve the second encrypted archive from a private storage system based on the first manifest document identifying the second encrypted archive, the private storage system being different from the distributed ledger, the second manifest document identifying a plurality of manifest documents, each manifest document from the plurality of manifest documents associated with a different activity of the complex transaction; and
initialize a representation of the complex transaction based on the plurality of manifest documents.

15. The non-transitory processor readable medium of claim 14, wherein the second manifest document identifies the plurality of manifest documents by identifying a plurality of encrypted archives, each encrypted archive from the plurality of encrypted archives decryptable to retrieve a manifest document from the plurality of manifest documents.

16. The non-transitory processor readable medium of claim 14, wherein at least a subset of the plurality of manifest documents identify one or more data products from a plurality of data products, each data product from the plurality of data products stored on the private storage system that is different from the distributed ledger such that the representation of the complex transaction can be initialized based only on the first manifest document and data retrieved from the private storage system.

17. A non-transitory processor readable medium storing code representing instructions configured to be executed by a processor, the code comprising code to cause the processor to:
retrieve a plurality of manifest documents from a distributed ledger, each manifest document from the plurality of manifest documents generated in response to an activity in a complex transaction, each manifest document uniquely associated with a block of the distributed ledger
each manifest document from the plurality of manifest documents, other than a first manifest document, identifying at least one other manifest document from the plurality of manifest documents, at least a subset of the plurality of manifest documents identifying at least one data product from a plurality of data products;
retrieve the plurality of data products based on the plurality of data products being identified by the subset of the plurality of manifest documents, at least one data product from the plurality of data products including a public encryption key identifying an authorized party associated with the complex transaction;
verify an identity of the authorized party using the public encryption key to validate the complex transaction;
define a representation of the complex transaction based on the plurality of manifest documents and the plurality of data products; and
initialize a simulation of the complex transaction based on the representation of the complex transaction.

18. The non-transitory processor readable medium of claim 17, wherein:
the plurality of manifest documents is a first plurality of manifest documents; and
the distributed ledger is a first distributed, the code further comprising code to cause the processor to:
retrieve a second plurality of manifest documents from a second distributed ledger different from the first distributed ledger based on references to the second plurality of manifest documents within the first plurality of manifest documents, the representation of the complex transaction based on the first plurality of manifest documents and the second plurality of manifest documents.

19. The non-transitory processor readable medium of claim 17, wherein at least a subset of the plurality of data products are retrieved from one or more data repositories other than the distributed ledger.

20. The non-transitory processor readable medium of claim 17, wherein each data product from the plurality of data products is retrieved from a data repository other than the distributed ledger, the code further comprising code to cause the processor to:

validate each data product from the plurality of data products based on at least one of a hash or a checksum of that data product contained within a manifest document from the plurality of manifest documents that identifies that data product.

\* \* \* \* \*